United States Patent
Zatsepin et al.

(10) Patent No.: US 11,481,284 B2
(45) Date of Patent: Oct. 25, 2022

(54) SYSTEMS AND METHODS FOR GENERATING SELF-NOTARIZED BACKUPS

(71) Applicant: Acronis International GmbH, Schaffhausen (CH)

(72) Inventors: Vladimir Zatsepin, Moscow (RU); Serguei Beloussov, Moscow (RU); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 164 days.

(21) Appl. No.: 17/098,727

(22) Filed: Nov. 16, 2020

(65) Prior Publication Data

US 2021/0149772 A1    May 20, 2021

Related U.S. Application Data

(60) Provisional application No. 62/935,325, filed on Nov. 14, 2019.

(51) Int. Cl.
  *G06F 12/00* (2006.01)
  *G06F 11/14* (2006.01)
  *H04L 9/32* (2006.01)
  *G06F 11/10* (2006.01)

(52) U.S. Cl.
  CPC ...... *G06F 11/1464* (2013.01); *G06F 11/1004* (2013.01); *G06F 11/1451* (2013.01); *G06F 11/1461* (2013.01); *G06F 11/1469* (2013.01); *H04L 9/3247* (2013.01); *H04L 9/3297* (2013.01)

(58) Field of Classification Search
  CPC ............ G06F 11/1464; G06F 11/1004; G06F 11/1451; G06F 11/1461; G06F 11/1469; G06F 3/065; H04L 9/3247; H04L 9/3297; H04L 9/50
  See application file for complete search history.

(56) References Cited

U.S. PATENT DOCUMENTS

2018/0294956 A1* 10/2018 O'Brien ............... H04L 9/3242

* cited by examiner

*Primary Examiner* — Shawn X Gu
(74) *Attorney, Agent, or Firm* — ArentFox Schiff LLP; Michael Fainberg

(57) ABSTRACT

Disclosed herein are systems and methods for enabling self-notarization in a data backup. In one aspects, a method may comprise generating the data backup at a computing device. The method may comprise calculating a checksum of the data backup. The method may comprise adding a self-notarization script to the data backup. The self-notarization script may be configured to automatically trigger without intervention by an external notarization system, in response to a pre-determined backup storage event, and in response to triggering, notarize and send the checksum to a distributed registry. The method may comprise sending the data backup comprising the self-notarization script to a backup storage device.

18 Claims, 3 Drawing Sheets

SYSTEMS AND METHODS FOR GENERATING SELF-NOTARIZED BACKUPS

CROSS-REFERENCE TO RELATED APPLICATIONS

This application claims the benefit of U.S. Provisional Application No. 62/935,325, filed Nov. 14, 2019, which is herein incorporated by reference.

FIELD OF TECHNOLOGY

The present disclosure relates to the field of data storage, and, more specifically, to systems and methods for generating self-notarized backups.

BACKGROUND

Data authentication refers to verifying the integrity and immutability of the data stored in data storage. One approach to performing authentication is by registering data using a reliable distributed ledger (e.g., a blockchain). Conventional authentication systems for backup archives tend to focus solely on data integrity and do not consider data validity. Data validity must be performed manually, which requires human involvement. As in all cases where human involvement is concerned, there is room for error (e.g., forgetting to validate, incorrect validation, etc.) Thus, although blockchain is a reliable option, improvements in the field are needed to provide safer data storage, ease of use, and elimination of human factor interference.

SUMMARY

The present disclosure details systems and methods for realizing such improvements in reliable authentication of archive data by binding the contents of the backup to the notarization process. Specifically, an executable self-notarization module is included in the backup copy of the data and is automatically launched according to predefined conditions. The self-notarization module further records the contents of the backup in a distributed ledger, ensuring reliable storage of such records and protecting them from modification or spoilage.

The automatic execution of notarization transactions at the level of the data itself and the creation of self-notarized data blocks (backups) provides a number of advantages, such as: (1) automation of reliable data authentication processes for large amounts of data, (2) use of self-notarization technology for the needs of digital forensics, and (3) elimination of human factor interference in authentication and data verification processes.

In an exemplary aspect, a method for enabling self-notarization in a data backup may comprise generating the data backup at a computing device. The method may comprise calculating a checksum of the data backup. The method may comprise adding a self-notarization script to the data backup. The self-notarization script may be configured to automatically trigger without intervention by an external notarization system, in response to a pre-determined backup storage event, and in response to triggering, notarize and send the checksum to a distributed registry. The method may comprise sending the data backup comprising the self-notarization script to a backup storage device.

In some aspects, the method may comprise storing details of a smart contract at the backup storage device, wherein the pre-determined backup storage event is an execution of the smart contract.

In some aspects, the self-notarization script is further configured to notarize results of the execution of the smart contract.

In some aspects, the self-notarization script is further configured to detect when the computing device begins loading the data backup to the backup storage device and in response to the detecting, notarize files in the data backup at the compute device.

In some aspects, the self-notarization script is further configured to detect when the computing device completes loading the data backup at the backup storage and in response to the detecting, notarize files in the data backup at the backup storage device.

In some aspects, the self-notarization script is further configured to notarize one or more of: the checksum, a timestamp of the data backup, a link to a previous record, and information about a physical address at the backup storage device.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for self-notarizing backups. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
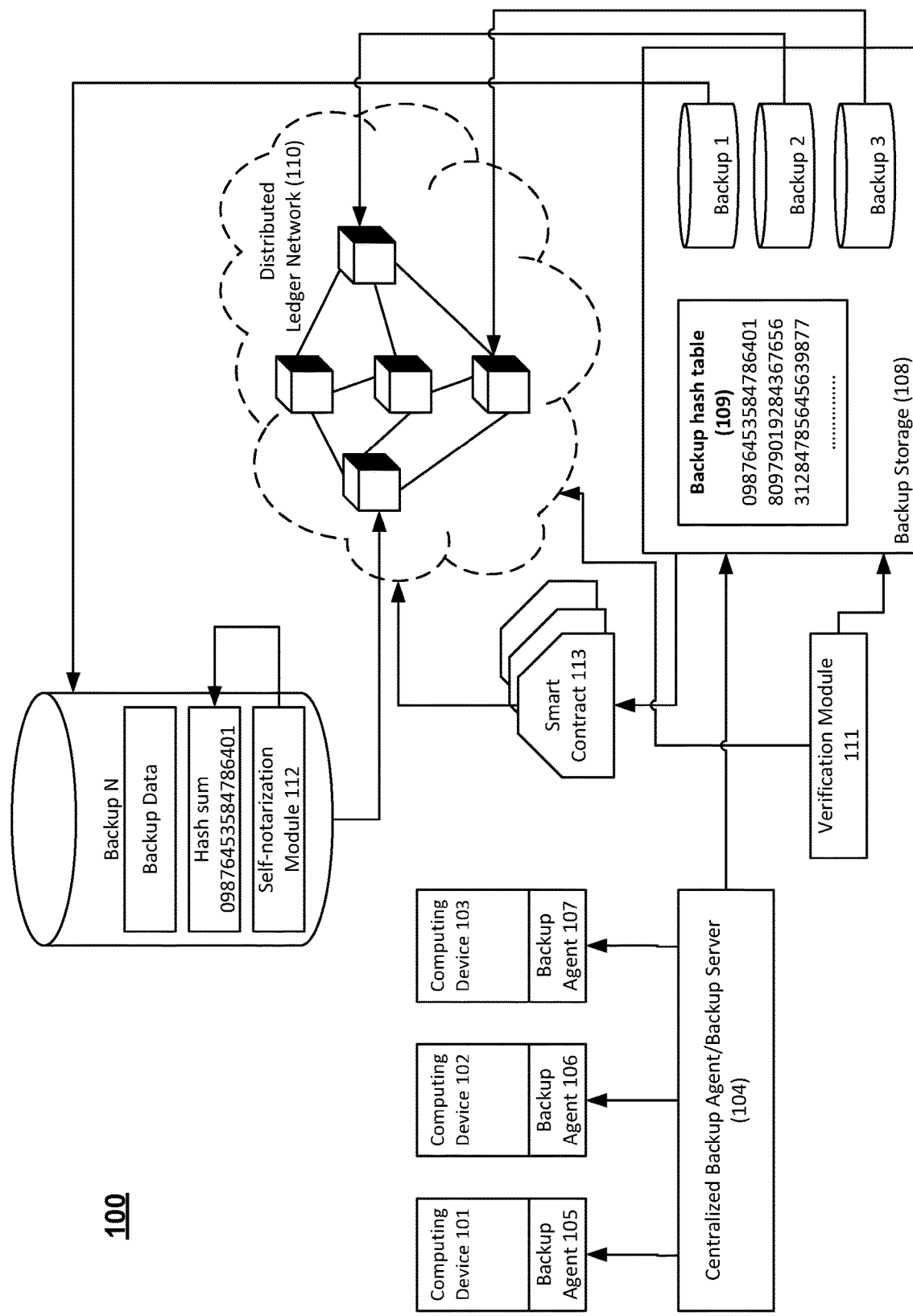
FIG. 1 is a block diagram illustrating a system for enabling self-notarization in a data backup, in accordance with aspects of the present disclosure.

FIG. 1 is a block diagram illustrating system 100 for enabling self-notarization in a data backup, in accordance with aspects of the present disclosure. System 100 comprises a plurality of computing devices 101, 102, and 103. Although only three computing devices are depicted, one skilled in the art would appreciated that more or fewer computing devices may be included in the plurality of computing devices. The data stored on computing devices 101, 102, and 103 may be backed up periodically (e.g., once every hour) to backup storage 108. In some aspects, computing devices 101, 102, and 103, may be nodes in distributed ledger network 110, while in other aspects, the nodes in distributed ledger network 110 may not include computing devices 101, 102, and 103. In some aspects, the backup can be carried out using local backup agents 105, 106, and 107 installed on computing devices 101, 102, and 103, respectively. In some aspects, the backup can be carried out by a centralized backup agent 104, which manages the planning and execution of all backup operations. Backups may be stored in backup storage 108. It should be noted that backup storage 108 may be a local or network drive, a dedicated server on the network, cloud storage and any other storage system.

After a backup (either full or incremental) is generated, verification module 111 calculates the checksum of the backup data. Verification module 111 may be stored on backup storage 108, on a computing device, or may be implemented as a separate service in the backup environment. Verification module 111 can be combined with any backup and recovery agent/unit, which check the archive periodically or before restoring data. Accordingly, the checksum calculation can be performed at storage 108 or locally, respectively. The checksum may be a hash value. For example, verification module 111 may calculate the checksum using the MD5 hashing algorithm, resulting in a 128-bit hash value, or using the SHA-1 hashing algorithm, resulting in a 160-bit hash value. It should be appreciated that the disclosure is not limited to the above-mentioned hashing algorithms as verification module 111 may use any hashing algorithm or combination of hashing algorithms.

The checksum may be stored in backup storage 108, specifically in backup hash table 109. The checksum may serve as metadata of a particular backup. For example, in FIG. 1, three backups are shown in backup storage 108 and three checksums are shown in backup hash table 109. The first checksum "09876453584786401" may be of backup 1, the second checksum "80979019284367656" may be of backup 2, and the third checksum "31284785645639877" may be of backup 3.

Centralized backup agent 104 or backup agents 105, 106, and 107 may place self-notarization module 112 inside each backup. Accordingly, each backup (e.g., backup 1) comprises the data from a computing device that is to be stored, the checksum of the data, and self-notarization module 112. An exemplary aspect in system 100 depicts backup N, which is analogous to backup 1. Self-notarization module 112 comprises an executable code or a link to an external executable code (e.g., a script) that can be launched on the basis of any event or according to conditions prescribed in smart contract 113. In some aspects, the executable code may be executed by an internal scheduler of self-notarization module 112 that detects events and/or times. In some aspects, the executable code may be executed in response to an external command from a centralized backup software (e.g., Centralized Backup Agent/Backup Server 104) to execute the code.

In some aspects, self-notarization module 112 may wait for a checksum to be computed and then notarize the checksum. Subsequently, self-notarization module 112 may wait for the backup to be sent to a node of the blockchain and then notarize the data in the backup again. Thus, at each step, the data in the backup and its associated information (e.g., checksums) are validated. This added level of security ensures that both data integrity and validity are maintained.

Smart contract 113 is a self-executing contract directly written into lines of code with terms of agreement between all participants in a transaction. The code and the agreements contained therein exist across distributed ledger network 110 (e.g., a decentralized blockchain network). The code controls the execution, and transactions are trackable and irreversible.

Self-notarization is an automated process. In some aspects, self-notarization module 112 is always running to track when the backup process begins and ends to determine whether to self-execute its script. For example, self-notarization module 112 may self-execute the script when a backup is fully placed into backup storage 108 without manual intervention. Self-notarization module 112 may notarize the checksum, the timestamp of backup, the link to a previous record, information about the physical address of the backup archive (e.g., storage ID, offset, etc.). In some aspects, self-notarization module 112 may send the notarized checksum (e.g., the hash value) or part of the checksum to distributed ledger network 110.

In some aspects, self-notarization module 112 may send, via centralized backup agent 104, backup agent 105, 106, or 107, the other notarized information listed above such as the timestamp, the physical storage address, etc. It should be noted that the timestamp is a key parameter for any blockchain operation, and thus utilizing the time of notarization in some aspects helps make verification stronger because there is an added layer of security.

Notarization is the process of confirming the validity of data (e.g., that the data comes from a trusted source and is delivered to where the data should be delivered). In technical terms, notarized information such as the notarized checksum is a recorded entry which is confirmed by distributed ledger network 110 (e.g. more than half of blockchain nodes confirmed that the checksum was transacted successfully).

In an approach where a single notarization entity is utilized (e.g., one node that is dedicated to notarizing information or an external notarization system), rather than a self-notarization module 112 inside each backup, the benefits offered by the present disclosure are not realized. In the systems and methods of the present disclosure, the notarization information follows the data wherever it goes. Because each backup can notarize itself, the time spent for sending data back to a single notarization entity after each stage (e.g., after calculating a checksum, after transmitting to storage 108, after storing in storage 108, etc.) is not needed. Furthermore, the single notarization entity may require time to perform additional checks in case backups have no special marks like "notarize" or "do not notarize," which were made during data classification before a backup. In this case, that processing and time is unnecessary because self-notarization module 112 is configured to execute its executable code at pre-determined instances. Not to mention, as the amount of information increases (e.g., if there are a significant amount of backups or large backups), the shortcomings of a dedicated single notarization entity are magnified. This is because transmission times, processing times, and storage requirements may all increase.

In some aspects, a backup comprises a hash or a hash-tree calculated by verification module 111 based on the contents of the backup. The backup and the link to the blockchain transaction that notarized the backup is sent, by self-notarization module 112, to distributed ledger network 110 (e.g., a public/private blockchain).

Figure 2:
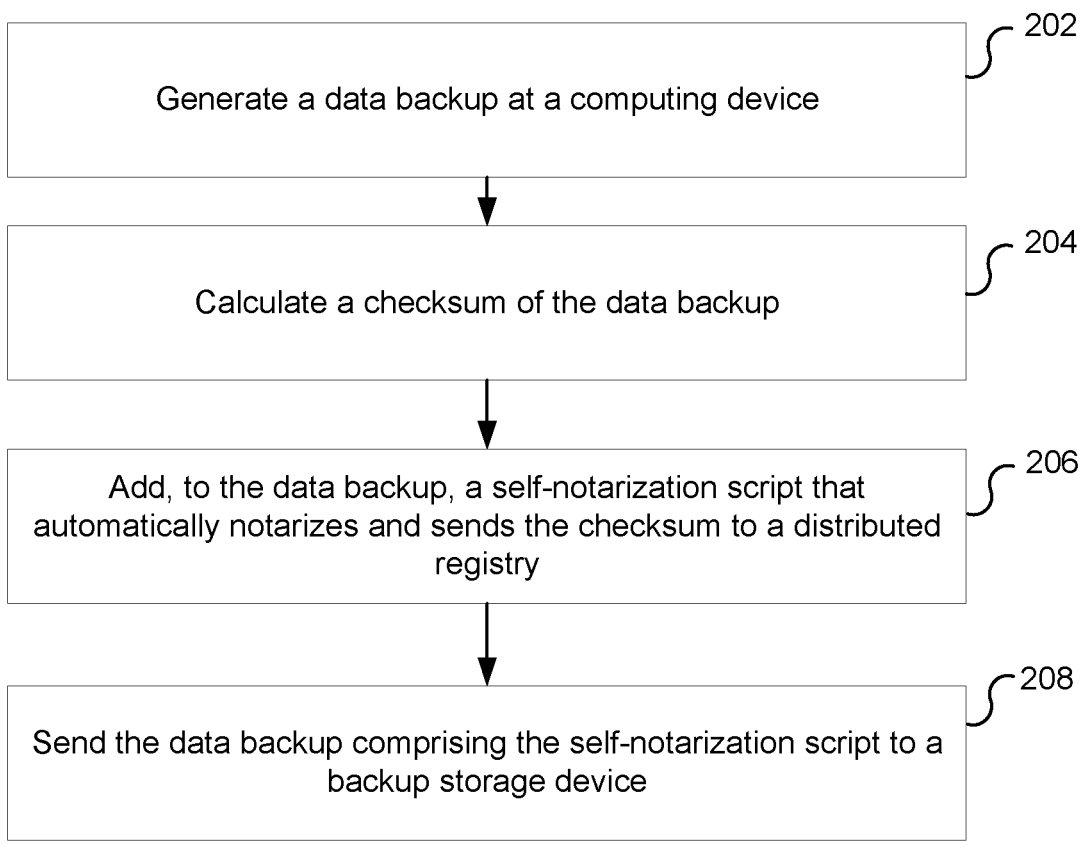
FIG. 2 illustrates a flow diagram of a method for enabling self-notarization in a data backup, in accordance with aspects of the present disclosure.

FIG. 2 illustrates a flow diagram of method 200 for enabling self-notarization in a data backup, in accordance with aspects of the present disclosure. At 202, a computing device (e.g., 101, 102, 103) generates a data backup (e.g., backup N). At 204, the computing device calculates a checksum of the data backup (e.g., 09876453584786401). The computing device may specifically perform this calculation using verification module 111.

At 206, the computing device adds a self-notarization script (e.g., self-notarization module 112) to the data backup. The self-notarization script is configured to automatically trigger in response to a pre-determined backup storage event and in response to triggering, notarize and send a particular piece of information to a distributed registry (e.g., managed by distributed ledger network 110). For example, in response to detecting that the checksum has been calculated, the self-notarization script may notarize and send the notarized checksum to the distributed registry. In some aspects, the self-notarization script may notarize the timestamp of when the calculation was performed. In another example, the pre-determined backup storage event may be the transmission of the backup to storage 108, upon which a confirmation message of receipt may be notarized and sent to the distributed registry.

In some aspects, the computing device may also store details of a smart contract at the backup storage device where the data backup is to be uploaded (e.g., backup storage 108). In this case, the pre-determined backup storage event may be an execution of the smart contract (e.g., smart contract 113). Thus, the self-notarization occurs in response to the execution of the smart contract. For example, a service provider in a data storage center signs a smart contract with a tenant of these services, according to which all data stored by the tenant will be automatically notarized upon the arrival of a certain time or certain conditions. Accordingly, the self-notarization script may execute and notarize the results of the execution of the smart contract.

At 208, the computing device sends the data backup comprising the self-notarization script to the backup storage device for storage. As discussed previously, a blockchain is a distributed database managed by a network with multiple replicas. Each replica (e.g., node) has its own owner who decides whether or not to update the node. The distributed database is organized as a chain of blocks, with each block comprising a set of transactions (operations to change the state of the database). Individual transactions are conventionally created by blockchain users. In the present disclosure, however, agent/server 104 acts a common servicer that first collects all the transactions (e.g., backups) and sends it to blockchain network. The network nodes then combine the collected transactions into blocks. A node that creates a block (usually called a miner or generator) sends it to other nodes, which check its correctness, and then attach it to their chain and update the state of the database. Thus, the nodes in a network ensure data integrity and immutability. With the added notarization, a configured network may query whether any received information has been notarized when checking for correctness. If a notarization is missing, the information may not be correct and thus discarded by the nodes of a network.

Figure 3:
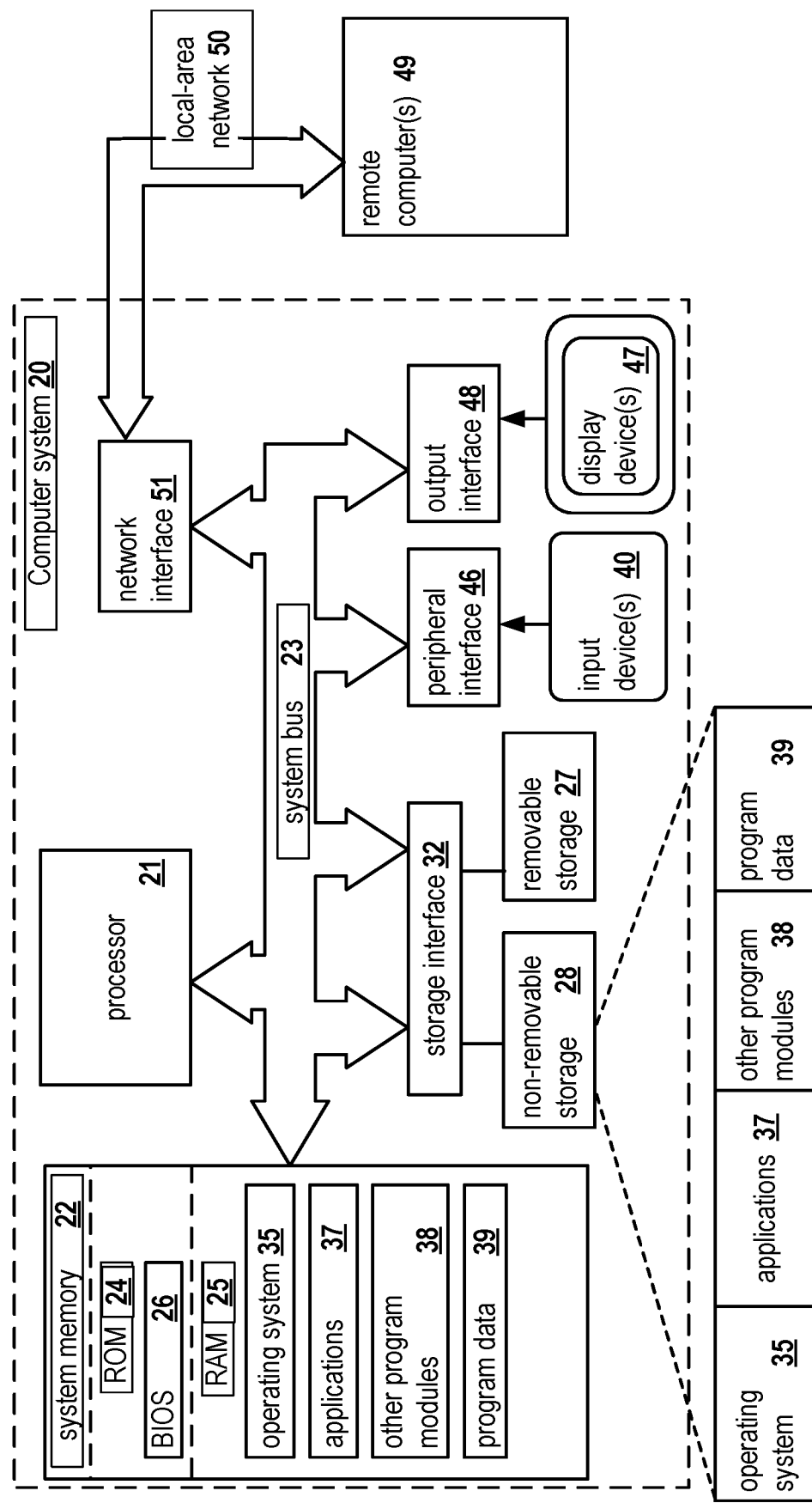
FIG. 3 presents an example of a general-purpose computer system on which aspects of the present disclosure can be implemented.

FIG. 3 is a block diagram illustrating a computer system 20 on which aspects of systems and methods for enabling self-notarization in a data backup may be implemented in accordance with an exemplary aspect. The computer system 20 can be in the form of multiple computing devices (e.g., computing devices 101, 102, 103), or in the form of a single computing device, for example, a desktop computer, a notebook computer, a laptop computer, a mobile computing device, a smart phone, a tablet computer, a server (e.g., backup server 104, backup storage 108), a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, PC, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1 and 2 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for enabling self-notarization in a data backup, the method comprising:
  generating the data backup at a computing device;
  calculating a checksum of the data backup;
  adding a self-notarization script to the data backup, wherein the self-notarization script is configured to:
    automatically trigger without intervention by an external notarization system, in response to a pre-determined backup storage event; and
    in response to triggering, notarize and send the checksum to a distributed registry;
  sending the data backup comprising the self-notarization script to a backup storage device.

2. The method of claim 1, further comprising:
  storing details of a smart contract at the backup storage device,
  wherein the pre-determined backup storage event is an execution of the smart contract.

3. The method of claim 2, wherein the self-notarization script is further configured to notarize results of the execution of the smart contract.

4. The method of claim 1, wherein the self-notarization script is further configured to detect when the computing device begins loading the data backup to the backup storage device and in response to the detecting, notarize files in the data backup at the compute device.

5. The method of claim 4, wherein the self-notarization script is further configured to detect when the computing device completes loading the data backup at the backup storage device and in response to the detecting of loading completion, notarize files in the data backup at the backup storage device.

6. The method of claim 1, wherein the self-notarization script is further configured to notarize one or more of:
  the checksum,
  a timestamp of the data backup,
  a link to a previous record, and
  information about a physical address at the backup storage device.

7. A system for enabling self-notarization in a data backup, the system comprising a processor configured to perform:
  generating the data backup at a computing device;
  calculating a checksum of the data backup;
  adding a self-notarization script to the data backup, wherein the self-notarization script is configured to:
    automatically trigger without intervention by an external notarization system, in response to a pre-determined backup storage event; and
    in response to triggering, notarize and send the checksum to a distributed registry;
  sending the data backup comprising the self-notarization script to a backup storage device.

8. The system of claim 7, wherein the processor is further configured to perform:
  storing details of a smart contract at the backup storage device,
  wherein the pre-determined backup storage event is an execution of the smart contract.

9. The system of claim 8, wherein the self-notarization script is further configured to notarize results of the execution of the smart contract.

10. The system of claim 7, wherein the self-notarization script is further configured to detect when the computing device begins loading the data backup to the backup storage device and in response to the detecting, notarize files in the data backup at the compute device.

11. The system of claim 10, wherein the self-notarization script is further configured to detect when the computing device completes loading the data backup at the backup storage device and in response to the detecting of loading completion, notarize files in the data backup at the backup storage device.

12. The system of claim 7, wherein the self-notarization script is further configured to notarize one or more of:
  the checksum,
  a timestamp of the data backup,
  a link to a previous record, and
  information about a physical address at the backup storage device.

13. A non-transitory computer readable medium storing thereon computer executable instructions for enabling self-notarization in a data backup, including instructions when executed by a processor cause the processor to perform:
  generating the data backup at a computing device;
  calculating a checksum of the data backup;
  adding a self-notarization script to the data backup, wherein the self-notarization script is configured to:
    automatically trigger without intervention by an external notarization system, in response to a pre-determined backup storage event; and
    in response to triggering, notarize and send the checksum to a distributed registry;
  sending the data backup comprising the self-notarization script to a backup storage device.

14. The non-transitory computer readable medium of claim 13, further including instructions for:
  storing details of a smart contract at the backup storage device,
  wherein the pre-determined backup storage event is an execution of the smart contract.

15. The non-transitory computer readable medium of claim 14, wherein the self-notarization script is further configured to notarize results of the execution of the smart contract.

16. The non-transitory computer readable medium of claim 13, wherein the self-notarization script is further configured to detect when the computing device begins loading the data backup to the backup storage device and in response to the detecting, notarize files in the data backup at the compute device.

17. The non-transitory computer readable medium of claim 16, wherein the self-notarization script is further configured to detect when the computing device completes loading the data backup at the backup storage device and in response to the detecting of loading completion, notarize files in the data backup at the backup storage device.

18. The non-transitory computer readable medium of claim 13, wherein the self-notarization script is further configured to notarize one or more of:
  the checksum,
  a timestamp of the data backup,
  a link to a previous record, and information about a physical address at the backup storage device.

* * * * *